United States Patent
Mano

[11] Patent Number: 6,143,201
[45] Date of Patent: Nov. 7, 2000

[54] METHOD OF MANUFACTURING FLUORESCENT MATERIAL

[75] Inventor: Yasuhiro Mano, Shiga, Japan

[73] Assignee: NEC Corporation, Tokyo, Japan

[21] Appl. No.: 09/179,562

[22] Filed: Oct. 27, 1998

[30] Foreign Application Priority Data

Oct. 28, 1997 [JP] Japan ................................... 9-295543

[51] Int. Cl.[7] .............................. C09K 11/56; C09K 11/54
[52] U.S. Cl. ............................... 252/301.6 S; 252/301.6 F
[58] Field of Search ..................... 252/301.6 S, 301.4 R, 252/301.5, 301.6 F, 301.4 C

[56] References Cited

U.S. PATENT DOCUMENTS

| | | | |
|---|---|---|---|
| 2,402,759 | 6/1946 | Leverenz | 252/301.6 S |
| 5,250,365 | 10/1993 | Hedden et al. | 252/301.5 |

FOREIGN PATENT DOCUMENTS

| | | |
|---|---|---|
| 61-296085 | 12/1986 | Japan . |
| 6-306355 | 11/1994 | Japan . |

OTHER PUBLICATIONS

Ball Mill Handbook, the first edition, Publisher: Nikkon Kogyo Shimbun, May 30, 1995.

*Primary Examiner*—C. Melissa Koslow
*Attorney, Agent, or Firm*—McGuire, Woods, Battle & Boothe, LLP

[57] ABSTRACT

In the production of a fluorescent material, firstly a particle growth retardant is mixed with a fluorescent raw material and then the mixture is baked, whereupon the baked mixture is washed and dried as an intermediate fluorescent material. Then, the particle growth retardant is removed from the surface of the intermediate fluorescent material and crystal defects are formed in the particle-growth-retardant-free intermediate fluorescent material using a ball mill or an ultrasonic vibrator, etc. Finally, the resulting intermediate fluorescent material is baked again and is then washed and dried as a final fluorescent material. This fluorescent material is particularly useful when used in a scatter electroluminescent panel serving as a back light of a liquid crystal display, which must be very small in thickness and light in weight.

14 Claims, 3 Drawing Sheets

FIG.2(b) (PRESENT INVENTION)

METHOD OF MANUFACTURING FLUORESCENT MATERIAL

BACKGROUND OF THE INVENTION

1. Field of the Invention

This invention relates to a method of manufacturing a fluorescent material, and more particularly to a method of manufacturing a high-luminance fluorescent material in small-size particles suitable for use in a scatter electroluminescent (EL) panel, a cathode ray tube, a vacuum fluorescent display, etc.

2. Description of the Related Art

The conventional manufacturing method for a fluorescent material to be used in a scatter EL panel (hereinafter also called the electroluminescent lamp) 7 will now be described. As shown in FIG. 4 of the accompanying drawings, the scatter EL panel 7 has a thin laminate structure in which a luminous layer 5 and a reflective insulating layer 6 are sandwiched between a transparent electrode 2 in the form of an ITO (indium tin oxide) formed on a transparent film 1 and a backing electrode 3 in the form of an aluminum foil or carbon paste. In the luminous layer 5, a fluorescent material 4 of zinc sulfide activated by copper or halogen is scattered in an organic binder. In the reflective insulating layer 6, a highly dielectric substance such as barium titanate is scattered in an organic binder. If an a. c. voltage is applied between the transparent electrode 2 and the backing electrode 3, the fluorescent material 4 emits light in an intense electric field. For its very small thickness, light weight and wide light-emitting area, this electroluminescent lamp 7 is suitable for a back light of a liquid crystal display, a planar display device and the like.

The fluorescent material 4 is manufactured usually in the following manner: Firstly, zinc sulfide (ZnS) in fine powder of several-$\mu$m-particle size as a starting material, 0.1–1.0 molecular % of copper sulfate ($CuSO_4$) as an activator, and 5–20 molecular % of halide, e.g. alkaline earth metal and alkali metal, such as magnesium chloride ($MgCl_2$), as an coactivator and also a particle growth promoter (flux) are mixed to obtain a mixture in fine particles. This mixture is baked in a crucible in atmosphere or hydrogen sulfide at a temperature of approximately 1000° C. for several hours, and then impurities such as copper sulfide on the particle surfaces are washed away with a KCN (potassium cyanide) aqueous solution, whereupon the mixture is dried to obtain a powdery fluorescent material 4.

However, this fluorescent material does not always guarantee a long life. Consequently, as disclosed in Japanese Patent Laid-Open Publication No. Sho61-296085, an improved method in an effort to manufacture a high-luminance, long-life fluorescent material was proposed. In this improved method, the above-mentioned mixture is baked at a high temperature of 1100–1200° C. for 3–10 hours and is then washed with deionized water to obtain an intermediate fluorescent material, whereupon a static pressure is added to the intermediate fluorescent material by a rubber press to convert the crystal form from a hexagonal system into a cubic system. This resulting intermediate fluorescent material is further baked at 700–950° C. to obtain a final fluorescent material in large-size particles whose crystal form is cubic.

Japanese Patent Laid-Open Publication No. Hei6-306355 discloses another improved method in an effort to realize a high-luminance, long-life fluorescent material. In this improved method, the intermediate fluorescent material obtained the first, high-temperature baking is stirred in a ball mill so that an impact force is added to the stirred intermediate fluorescent material to generate a strain. After crystal defects are thus caused, the resulting intermediate luminescent fluorescent is baked again in atmosphere at a relatively low temperature of 500–800° C. so that the strain segregates copper to obtain a final fluorescent material.

In recent years, portable small-sized wireless devices, such as portable telephones, PHS (portable handy phone system) terminals and pagers, each using a liquid crystal display have boomed. Since its power source is a battery, every device of this type essentially requires a low consumption. In particular, an electroluminescent lamp to be used as a back light of the liquid crystal display is relatively high in consumption as compared to other components of the device, and consequently, low-operating-voltage and high-luminance electroluminescent lamps are demanded. However, in an electroluminescent lamp using the conventional fluorescent material manufactured in the above-mentioned method, the operating voltage is an a. c. voltage of approximately 50 V or higher and is hence larger in consumption. Further, the larger the size of an inverter for converting the d. c. voltage of a several-V battery into an a. c. voltage, the higher the price.

One of reasons for the high operating voltage is that the medium particle size of the luminescent material 4 according to the conventional method is about 20–30 $\mu$m, which is large. Specifically, in order to uniformly print the luminous layer 5 in which this fluorescent material 4 is scattered in an organic binder, the thickness of the luminous layer 5 would be approximately 50 $\mu$m so that no effective application of voltage to the luminous layer can be achieved. This decreases the intensity of electric field on the fluorescent material to give only an insufficient luminance; therefore, the operating voltage must be increased high enough to obtain an required luminance. If the fluorescent material were high in luminance and small in particle size, the thickness of the luminous layer could have been reduced to lower the operating voltage of the electroluminescent lamp. Further, assuming that the luminance is sufficiently high even though the particle size is large, it is theoretically possible to lower the operating voltage, which is practically difficult to realize. It is also theoretically possible to reduce the particle size by lowering the baking temperature, shortening the baking time or reducing the amount of flux. Any of these attempts would not be practical as it actually lowers the luminance; especially, reduction of the amount of flux would result in an inadequate coactivator to lower the luminance as flux serves also as a coactivator.

SUMMARY OF THE INVENTION

With the foregoing problems in view, an object of this invention is to provide a method of manufacturing a fluorescent material in small-size crystal particles with which a high luminance can be obtained at low voltage.

Another object of the invention is to provide a method of manufacturing a fluorescent material which is uniformly μm or smaller in size of medium particles and is suitable for use in, for example, an electroluminescent lamp.

According to a first aspect of the invention, the above first-named object is accomplished by a method of manufacturing a fluorescent material, comprising the steps of: mixing a fluorescent raw material matrix, a flux, a particle growth retardant not reactive with the fluorescent raw material matrix and baking such mixture to obtain an intermediate fluorescent material; and removing the particle growth retardant from the intermediate fluorescent material. The result is that during the baking, the crystal growth of the raw material matrix is retarded by the action of the particle growth retardant so that a high-luminance, small-particle-size fluorescent material can be composed.

According to a second aspect of the invention, the above first-named object is accomplished alternatively by a method of manufacturing a fluorescent material, comprising the steps of: mixing a fluorescent raw material matrix, a flux, an activator raw material and a particle growth retardant not reactive with the fluorescent raw material matrix and then baking such mixture at a first predetermined temperature to obtain an intermediate fluorescent material; removing the particle growth retardant from the intermediate fluorescent material; forming crystal defects in the intermediate fluorescent material by; for example, ball mill or ultrasonic vibration; and baking the resulting intermediate fluorescent material at a second predetermined temperature lower than the first predetermined temperature. The result is that a small-particle-size fluorescent material whose luminance is increased to a maximum.

As a preferable feature, in the first or second aspect of the invention, the ratio of medium particle size of the particle growth retardant to that of the fluorescent raw material matrix is 0.2–1.7. According to this feature, a high-luminance, small-particle-size fluorescent material can be composed with no particle growth retardant remaining on the particle surface.

As another preferable feature, the ratio of the particle growth retardant to the fluorescent raw material matrix by weight is 3–100 weight %. According to this feature, a high-luminance fluorescent material whose particle size is 20 μm or smaller can be composed.

As still another preferable feature, the particle growth retardant is a chemically stable metal compound at high temperature including at least one selected from metal oxide, such as aluminum oxide, silicon oxide and zirconium oxide, nitride, such as silicon nitride and aluminum nitride, and carbonate, such as silicon carbonate, tungsten carbonate and tantalum carbonate. These named metal compounds are stable and easy to handle, and therefore, a high-luminance, small-particle-size fluorescent material can be obtained easily.

As a further preferable feature, the fluorescent raw material matrix is zinc sulfide, and the particle growth retardant is aluminum oxide or silicon oxide. According to this feature, a high-luminance, small-particle-size luminance material for electroluminescent lamps or cathode ray tubes can be obtained easily and inexpensively.

As an additional preferable feature, the removing of the particle growth retardant from the intermediate fluorescent material is carried out by ultrasonic vibration. According to this feature, it is possible to separate and remove the particle growth retardant off the crystal particle surface easily without damaging the intermediate fluorescent material.

BRIEF DESCRIPTION OF THE DRAWINGS

The above and other objects, advantages and features of the present invention will be more apparent from the following description taken in conjunction with the accompanying drawings in which:

FIGS. 2(a) and 2(b) are diagrams showing the composing principle of a small-particle fluorescent material according to the subject method in comparison with that of a conventional fluorescent material;

DETAILED DESCRIPTION OF THE BEST MODE OF THE INVENTION

Figure 1:
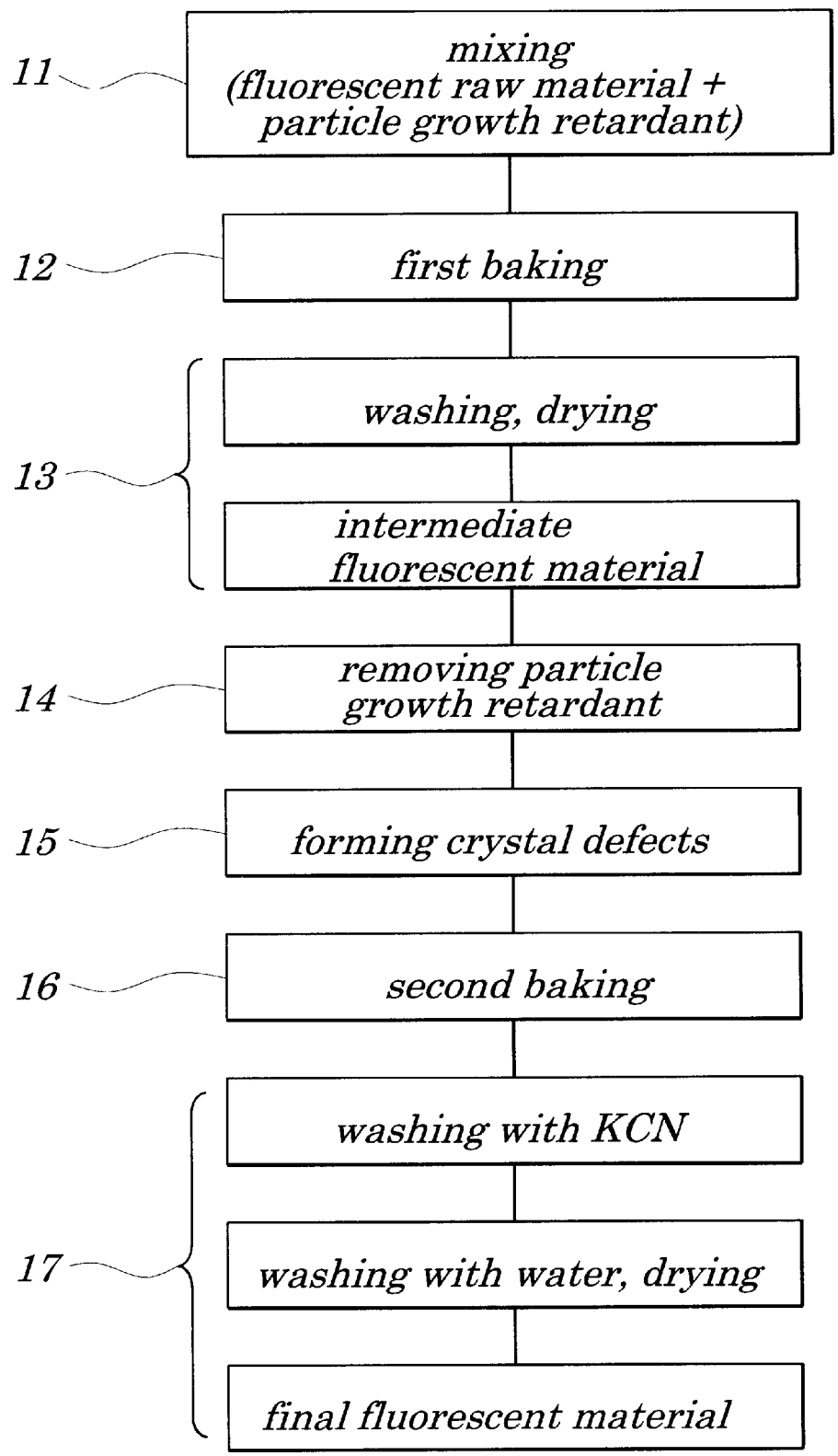
FIG. 1 is a process flowchart showing a fluorescent material manufacturing method according to this invention.

The principles of this invention are particularly useful when applied to a method of manufacturing a fluorescent mmterial, which will now be described.

The fluorescent material manufacturing method according to the first aspect of the invention comprises the steps of: mixing a fluorescent raw material matrix, a flux, a particle growth retardant not reactive with the fluorescent raw material matrix and baking such mixture to obtain an intermediate fluorescent material; and removing the particle growth retardant from the intermediate fluorescent material. This method of the invention basically utilizes the liquid crystal growth, which requires a flux. During baking, since the flux fuses to be filled in the spaces between the raw material matrix, chances of mutual contact of the particles of the raw material matrix increase to cause the liquid crystal growth. When the particle growth retardant is filled in the gaps between the raw material matrix, the chances of mutual contact of the matrix row material particles decrease to retard the liquid crystal growth. Although the amount of each of the activator and coactivator is optimal and enough for the crystal growth in baking, the crystal growth of the raw material matrix is retarded so that a high-luminance, small-particle-size fluorescent material can be composed easily. In the specification, the wording "not reactive" means "physically and chemically stable and not reactive with a fluorescent matrix raw material at all or reactive only a very little".

The manufacturing method according to the second aspect of the invention comprises the steps of: mixing a fluorescent raw material matrix, a flux, an activator raw material and a particle growth retardant not reactive with the fluorescent raw material matrix and then baking such mixture at a first predetermined teiperature to obtain an intermediate fluorescent material; removing the particle growth retardant from the intermediate fluorescent material; forming crystal defects in the particle-growth-retardant-free intermediate fluorescent material; and baking the resulting intermediate fluorescent material at a second predetermined temperature lower than the first predetermined temperature. By this second method, the conductive layer contributing to the electroluminescence is formed in high density to realize a small-particle-size fluorescent material whose luminance is increased to a maximum. Alternatively, the crystal defects forming step may be carried out before the particle grown retardant separating and removing step.

The particle growth retardant to be used in this invention is preferably not reactive with the fluorescent raw material matrix under such baking conditions (temperature, time, atmosphere, etc.) as to obtain a target chemical composition of fluorescent material. The particle growth retardant is preferably a chemically stable metal compound at high temperature including at least one selected from metal oxide, such as aluminum oxide, silicon oxide and zirconium oxide, nitride, such as silicon nitride and aluminum nitride, and carbonate, such as silicon carbonate, tungsten carbonate and tantalum carbonate.

Further, if the baking temperature is too high, it would occasionally decompose or react with the raw material matrix. Consequently, for the combination of ZnS and $Al_2O_3$, the baking temperature should not exceed 1500° C., and for the combination of ZnS and SiO2, it should not exceed 1300° C. Further, for alleviating direct contacts between the particles of the raw material matrix, the average particle size of the particle growth retardant is preferably equal to or smaller than that of the raw material matrix. If the particle size ratio of the particle growth retardant to the raw material matrix is too large, the particle growth retarding effect is reduced so that it is difficult to reduce the particle size; the present inventor(s) discovered an optimum value range for the particle size ratio. Furthermore, for effectively alleviating mutual contacts between the particles of the raw material matrix, the weight ratio of the particle growth retardant to the raw material matrix should be in an optimum range. If the weight ratio is too small, the particle growth retardant does not work so that the particles of the raw material matrix contact with one another easily to become large-size particles. If the weight ratio is too large, the particle growth retardant sticks to and stays on the particle surface of the fluorescent material so as not to be separated or removed off, lowering the luminance.

As long as the raw material matrix is not reactive with the particle growth retardant, it is not limited in this invention. And this invention can be applied to a method of manufacturing a fluorescent material in any material for use in electroluminescent lamps, cathode ray tubes and luminous display tubes as well. Also, ordinary materials may be used without restriction for the flux, the activator raw material and the coactivator raw material to be used in this invention.

As another feature, the method of this invention is characterized by removing the particle growth retardant off the particle surface of the intermediate fluorescent material after baking. The particle growth retardant does not emit light and therefore nust be removed. As long as it gives no bad influence to the fluorescent material, any means may be used to remove the residual particle growth retardant. As a preferable example, the particle growth retardant is mechanically separated by ultrasonic vibration to classify the mixture by the difference in dropping velocity in water. If the intermediate fluorescent material and the particle growth retardant are different in particle size from each other, a sieve may be used to classify the mixture.

Figure 2A:
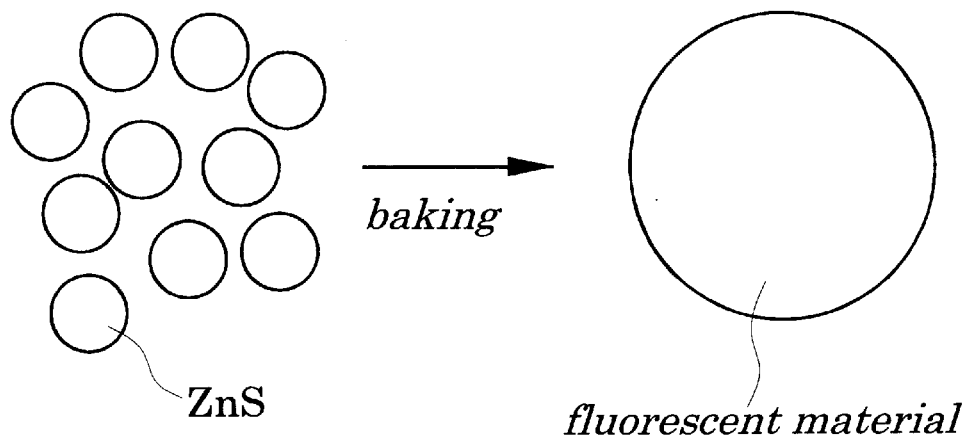
Figure 2A:
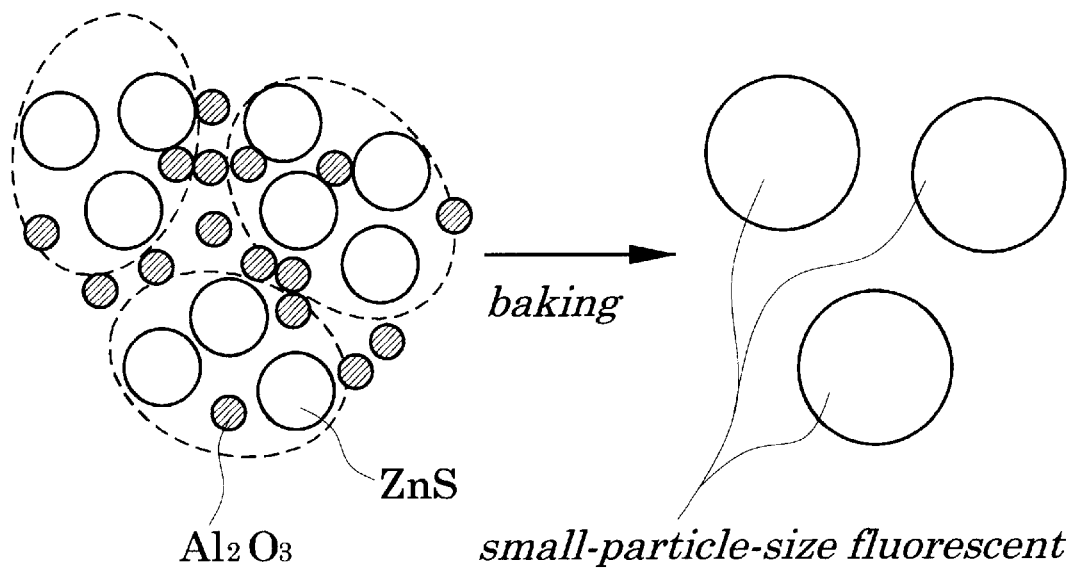

The reason why the small-particle-size fluorescent material of this invention is obtained by mixing the particle growth retardant with the fluorescent raw material matrix and then baking the mixture is as follows: In the conventional method, as shown in FIG. 2(a), many ZnS particles melt into a flux (not shown), which has been liquified by baking, to increase chances of contact with one another so that they grow as the particles grow into a larger size. Wherein in this invention, as shown in FIG. 2(b), fine particles of the particle growth retardant (e.g., aluminum oxide) are filled in gaps between ZnS particles to obstruct their mutual contacts, and as a result, only a relatively small number of ZnS particles adjacent one another surrounded by a broken-line ring grow into a single particle of fluorescent material.

EXAMPLE 1

Figure 3:
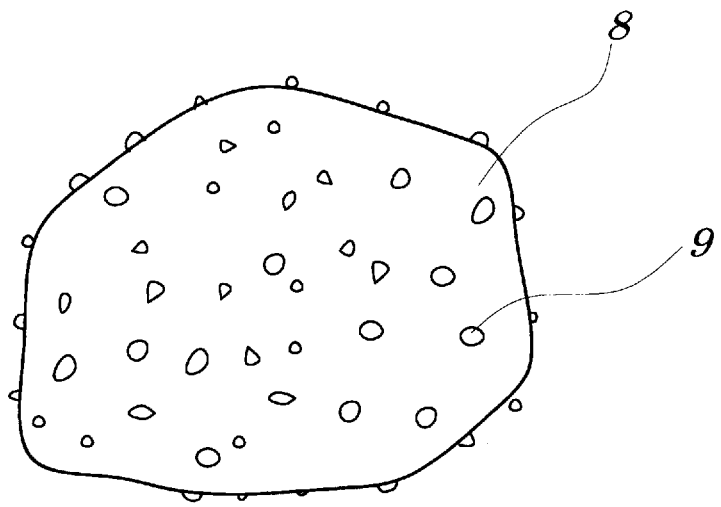
FIG. 3 is a perspective view showing an intermediate fluorescent material after the first baking step of the subject method.

A method of manufacturing a fluorescent material for electroluminescent lamps will now be described as a first example of this invention with reference to FIG. 1. Firstly, 0.1 molecular % of copper sulfide ($CuSO_4$) as an activator was wet-blended with 100 g of zinc sulfide in coagulant powder whose medium particle size is approximately 3 $\mu$m (however, the medium particle size of primary particles is approximately 0.05 $\mu$m), and such mixture was dried. Then, 100 g of α-alumina ("Sumicorundum, AA-2", product manufactured by Sumitomo Chemical Co., Ltd., a Japanese corporation), whose average particle size is 2 $\mu$m, as a particle growth retardant were dry-blended with the mixture, and in addition, 10 molecular % of magnesium chloride ($MgCl_2$) as a coactivator and flux were dry-blended with zinc sulfide (ZnS) (step 11). Then, the resulting mixture was baked in a crucible in atmosphere at a temperature of 1200° C. for three hours (first baking) (step 12), whereupon the mixture was washed several times with deionized water and dried to obtain an intermediate fluorescent material (step 13). The present inventor s observation with an electron microscope (SEM) proved that many alumina particles 9 were stuck to the particle surface of the intermediate fluorescent material 8 as shown in FIG. 3. The temperature of the first baking should be selected from a temperature range equal to or higher than 1020° C. at which the crystal system is transited from cubic to hexagonal.

Then, the intermediate fluorescent material with α-alumina particles stuck and deionized water were stirred in a beaker under ultrasonic vibration to mechanically separate the alumina particles stuck to the intermediate fluorescent material. Then, when only the stirring was terminated, the alumina particles floated to the upper portion of the beaker and the intermediate fluorescent material remained at the lower portion of the beaker; consequently, the alumina particles at the upper portion of the beaker were removed (step 14). This procedure was repeated to make the separating and removing thorough, and finally the intermediate fluorescent material was taken out of the beaker and dried. The present inventor's observation with an electron microscope (SEM) proved that many very small dents were in the particle surface of the intermediate fluorescent material. As presumed from their shape, size and distribution, these dents were marks where the alumina particles had been stuck. These facts indicate that the fluorescent raw material matrix and the alumina constitute substantially no compound.

Then, the intermediate fluorescent material, from which the alumina particles had been removed, and alumina balls of 1 nm in diameter were milled in magnetic pot at 50 rpm for three hours to give an impact force to the intermediate fluorescent material, thereby forming strains (crystal defects) inside the particles of the intermediate fluorescent material without crushing (step 15). Then, the intermediate fluorescent material with the strains was baked again in the crucible (step 16). This second baking was carried out at 500–900° C. lower than the above-mentioned crystal transition temperature for 30 minutes to three hours. As the result of this baking, in the existence of the strains, part of the whole crystal of the intermediate fluorescent material transited from a hexagonal system to a cubic system, and at the same time, copper was segregated at the boundary to form a conductive layer serving to assist in electroluminescence. Before the second baking, an activator and/or a coactivator maybe added. Then, the again-baked intermediate fluorescent material was washed with a KCN (potassium cyanide) aqueous solution to remove the unwanted substance such as copper sulfide stuck to the particle surface, whereupon the resulting intermediate fluorescent material was further washed with deionized water and was dried in an oven to obtain a final fluorescent material (step 17).

In this Examples, the ball mill technique (ball mill handbook, the first edition p74–79/May 30, 1995, publisher: Nikkan Kogyo Shimbunsha) employed a rotating mill which rotates the magnetic pot. Alternatively, a vibrating mill, an epicyclic mill or a stirring mill may be used.

EXAMPLES 2–4

In Examples 2–4, fluorescent materials were manufactured in the same specifications as Example 1 except that the average particle size of α-alumina was 0.6 μm, 5 μm and 18 μm, respectively.

EXAMPLES 5–8

In Examples 5–8, fluorescent materials were manufactured in the same specifications as Example 1 except that the weight of α-alumina to be blended with the mixture was 50 g, 25 g, 10 g and 1 g, respectively.

COMPARATIVE EXAMPLE 1

In Comparative Example 1 according to the conventional method, a fluorescent material was manufactured in the same specification as Example 1 except α-alumina was not used.

Figure 4:
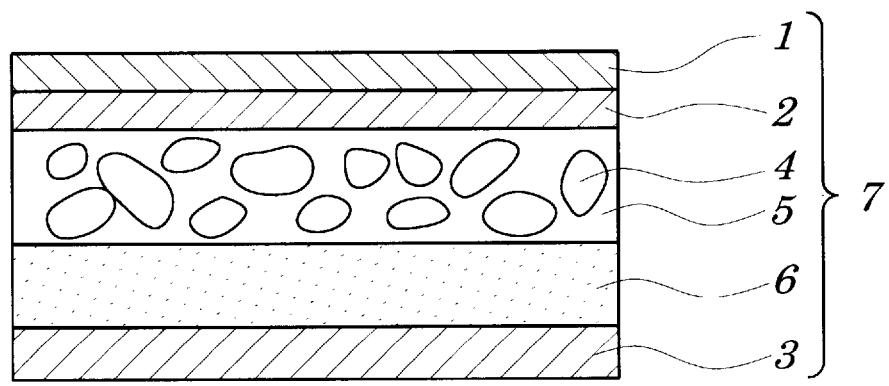
FIG. 4 is a fragmentary, enlarged cross-sectional view of a scatter EL panel used in the fluorescent material manufactured by the conventional method.

The medium particle size of each of the fluorescent materials manufactured in the specifications of Examples 1–8 and Comparative Example 1 was measured using a commercially available laser-diffraction-type particle size distribution measuring apparatus (type LA-500, manufactured by Horiba Seisakusho, Co., Ltd., a Japanese corporation). The results of this measuring are shown in Table 1. As understood from Table 1, the fluorescent materials manufactured by the subject method were smaller in medium particle size than that manufactured by the conventional method. For example, in Example 1, a uniform- and small-particle-size fluorescent material in which the size of medium particles is 13.70 μm, the particle size of 10% of all particles is 8.22 μm and the size of 90% of all particles is 22.33 μm. Using each of these fluorescent materials, an electroluminescent lamp with the luminous layer of FIG. 4 in optimum form was manufactured. When voltage-luminance characteristics was measured with application of a sine-wave a. c. voltage (600 Hz), a high luminance was obtained with the same voltage as the characteristics of the fluorescent materials according to this invention except Example 4 shifted toward the low-voltage side as compared to the fluorescentt material according to the conventional method; For the same luminance, the operating voltage lowered. Table 1 indicates also the voltage difference by which it could be lowered from the operating voltage of Comparative Example 1 with the same luminance as Comparative Example 1. According to the method of this invention, a high-luminance, small-particle-size fluorescent material operable at low voltage was realized.

TABLE 1

|  | Zinc sulfide (raw material matrix) | | Almina (particle growth retardant) | | medium particle | reduced operating voltage of |
| --- | --- | --- | --- | --- | --- | --- |
|  | medium particle size (μm) | weight (g) | medium particle size (μm) | weight of admixture(g) | size of luminescent material (μm) | electroluminescent lamp (with constant luminance) (V) |
| Example 1 | 3 | 100 | 2 | 100 | 13.7 | 15 |
| Example 2 | 3 | 100 | 0.6 | 100 | 14.9 | 13 |
| Example 3 | 3 | 100 | 5 | 100 | 15.3 | 10 |
| Example 4 | 3 | 100 | 18 | 100 | 18.2 | 0 |
| Example 5 | 3 | 100 | 2 | 50 | 13.8 | 17 |
| Exanple 6 | 3 | 100 | 2 | 25 | 14.5 | 18 |

TABLE 1-continued

|  | Zinc sulfide (raw material matrix) | | Almina (particle growth retardant) | | medium particle | reduced operating voltage of |
|---|---|---|---|---|---|---|
|  | medium particle size (μm) | weight (g) | medium particle size (μm) | weight of admixture(g) | size of luminescent material (μm) | electroluminescent lamp (with constant luminance) (V) |
| Example 7 | 3 | 100 | 2 | 10 | 15.8 | 16 |
| Example 8 | 3 | 100 | 2 | 1 | 22.1 | 5 |
| Comparative Example 1 | 3 | 100 | — | 0 | 24.1 | (reference) |

As is understood from Table 1, the size of medium particles of the final fluorescent material faintly depends on that of alumina. The smaller the medium particle size of alumina, the more the separation by dropping will be facilitated; however, if the medium particle size of alumina is large as in Example 4, the separation by dropping will become difficult. Consequently, the desired medium particle size of alumina (particle growth retardant) for the zinc sulfide (raw material matrix) is 3 μm is 0.6–5 μm. In the principle of particle growth retarding, the particle growth retarding effect depends on the relative particle size between the raw material matrix and the particle growth retardant. Therefore, this relation can be expressed by the ratio of the medium particle size of the particle growth retardant to that of the raw material matrix, and the ratio is preferably 0.2 (=0.6/3)–1.7 (=5/3). If the ratio is less than 0.2, the fine particle growth retardant flows in the melted flux so that the particle growth retarding effect will become small. If it exceeds 1.7, the separating by dropping is difficult to achieve so that the remaining particle growth retardant will absorb emitted light to lower the luminance.

Further, as is apparent from Table 1, the medium particle size of the final fluorescent material depends also on the weight of alumina mixed with the raw material matrix; this is, the larger, the weight of alumina, the smaller the medium particle size of the target fluorescent material. Partly since the desired medium particle size of the fluorescent material is equal to or smaller than 20 μm, and partly since this size corresponds to approximately 3 g of alumina, the weight of alumina to be mixed with 100 g of zinc sulfide is preferably 3–100 g. This also can be expressed by the weight percentage of the particle growth retardant to the raw material matrix, and the weight percentage is preferably 3–100 weight %. If it is less than 3 weight %, the particle size of a fluorescent material is not sufficiently small. If it exceeds 100 weight %, the amount of the particle growth retardant is too much and hence tends to stick to the particle surface of the fluorescent material so as not to be separated easily. The residual retardant will absorb emitted light to lower the luminance.

In Examples 1–8, zinc sulfide (ZnS) was used as the fluorescent matrix raw material. The matrix raw material is not limited to zinc sulfide and maybe (ZnSe) or (ZnCd) S. Further, aluminum oxide (alumina) was used as the particle growth retardant. The same results can be obtained with an alternative particle growth retardant in the form of a fine powdery metal oxide compound, such as silicon oxide (silica) or zirconium oxide, which are stable at high temperature. In another alternative, the particle growth retardant may be another metal compound in the form of nitride, such as silicon nitride and aluminum nitride, or in the form of carbonate such as silicon carbonate, tungsten carbonate and tantalum carbonate, which are chemically stable at high temperature. In still another alternative, the particle growth retardant may be any combination of two or more of these metal compounds. Further, in Examples 1–8, the baking was carried out two times. Alternatively the baking may be carried out only once. Even with only one baking, a small-particle size fluorescent material can be obtained by adding the particle growth retardant; in such event, however, the luminance is low as compared to the case of the twice baking.

Additionally, in Examples 1–8, the intermediate fluorescent material with the particle growth retardant having been removed was ball-milled to form strains (crystal defects) in the intermediate fluorescent material. Such strains can be obtained by applying ultrasonic vibration. For example, a beaker containing 200 g of the intermediate fluorescent material with 1 liter of pure water was placed in a bath of a ultrasonic vibrator (BRANSONIC U.S. CLEANER B3200, trade name, 47 KHz in frequency, 120 watts in power), and ultrasonicvibration was thereby added to the intermediate fluorescent material for 5–30 hours while the intermediate fluorescent material and pure water were stirred. Although this ultrasonic process is particularly simple as compared to ball mill, the same result as that by ball mill was obtained. Besides, when the particle growth retardant is removed from the intermediate fluorescent material by the ultrasonic process during a pre-treatment step and a post-treatment step, a single ultrasonic vibrator may be used commonly in both treatment steps. Any other alternative technique may be used, provided that it can accomplish the intended purpose as means for forming strains (crystal defects) in the intermediate fluorescent material.

As is mentioned above, the fluorescent material manufacturing method of this invention comprises the steps of: mixing a fluorescent raw material matrix, a flux, an activator raw material and a particle growth retardant not reactive with the fluorescent raw material matrix and then baking such mixture to obtain an intermediate fluorescent material; and removing the particle growth retardant from the intermediate fluorescent material. Since the particle growth retardant is filled in gaps between particles of the luminescent raw material matrix, chances of mutual contact of the particles of the raw material matrix are reduced to thereby retard crystal growth of the raw material matrix even under required baking conditions for crystal growth so that a high-luminance, small-particle-size fluorescent material can be composed. Using the fluorescent material manufactured from fluorescent raw material matrix of zinc sulfide by this invention, it is possible to manufacture a small-thickness, high-luminance scatter EL panel that operates at low voltage.

It is thus apparent that the present invention is not limited to the above embodiments but may be changed and modified without departing from the scope and spirit of the invention.

Finally, the present application claims the priority of Japanese Patent Application No. Hei9-295543 filed Oct. 28, 1997, which is herein incorporated by reference.

What is claimed is:

1. A method of manufacturing a fluorescent material, comprising the steps of:
    (a) mixing a fluorescent raw material matrix, a flux, a particle growth retardant not reactive with the fluorescent raw material matrix and baking such mixture to obtain an intermediate fluorescent material, wherein the ratio of particle size of the particle growth retardant to that of the fluorescent raw material matrix is 0.2–1.7; and
    (b) removing the particle growth retardant from the intermediate fluorescent material.

2. A method of manufacturing a fluorescent material, comprising the steps of:
    (a) mixing a fluorescent raw material matrix, a flux, a particle growth retardant not reactive with the fluorescent raw material matrix and baking such mixture to obtain an intermediate fluorescent material, wherein the particle growth retardant is a chemically stable metal compound including at least one selected from metal oxide, nitride, and carbonate; wherein said metal oxide is selected from the group comprising aluminum oxide, silicon oxide, and zirconium oxide; wherein said nitride is selected from the group comprising silicon nitride and aluminum nitride; and wherein said carbonate is selected from the group comprising silicon carbonate, tungsten carbonate, and tantalum carbonate; and
    (b) removing the particle growth retardant from the intermediate fluorescent material.

3. A method of manufacturing a fluorescent material, comprising the steps of:
    (a) mixing a zinc sulfide fluorescent raw material matrix, a flux, an aluminum oxide particle growth retardant not reactive with the fluorescent raw material matrix and baking such mixture to obtain an intermediate fluorescent material; and
    (b) removing the particle growth retardant from the intermediate fluorescent material.

4. A method of manufacturing a fluorescent material, comprising the steps of:
    (a) mixing a zinc sulfide fluorescent raw material matrix, a flux, an silicon oxide particle growth retardant not reactive with the fluorescent raw material matrix and baking such mixture to obtain an intermediate fluorescent material; and
    (b) removing the particle growth retardant from the intermediate fluorescent material.

5. A method of manufacturing a fluorescent material, comprising the steps of:
    a) mixing a fluorescent raw material matrix of zinc sulfide, a flux, an activator raw material and a particle growth retardant of aluminum oxide and then baking such mixture at a first temperature to obtain an intermediate fluorescent material;
    b) removing the particle growth retardant from the intermediate fluorescent material;
    c) forming crystal defects in the intermediate fluorescent material; and
    d) baking the resulting intermediate fluorescent material at a second temperature lower than the first temperature.

6. A method according to claim 5, wherein the ratio of particle size of the particle growth retardant to that of the fluorescent raw material matrix is 0.2–1.7.

7. A method according to claim 5, wherein the ratio of the particle growth retardant to the fluorescent raw material matrix by weight is 3–100 weight %.

8. A method according to claim 5, wherein said removing of the particle growth retardant from the intermediate fluorescent material is carried out by ultrasonic vibration.

9. A method according to claim 5, wherein said first temperature is 1020° C. or higher and said second temperature is 500–900° C. and wherein said fluorescent raw material matrix is ZnS and said particle growth retardant is alumina.

10. A method according to claim 5, wherein said forming of the crystal defects in the intermediate fluorescent material is carried out by ball mill.

11. A method according to claim 5, wherein said forming of the crystal defects in the intermediate fluorescent material is carried by ultrasonic vibration.

12. A method of manufacturing a fluorescent material, comprising the steps of:
    a) mixing a zinc sulfide fluorescent raw material matrix, a flux, an activator raw material and an aluminum oxide particle growth retardant, not reactive with the fluorescent raw material matrix, and the baking such mixture at a first temperature to obtain an intermediate fluorescent material;
    b) removing the particle growth retardant from the intermediate florescent material;
    c) forming crystal defects in the intermediate fluorescent material; and
    d) baking the resulting intermediate fluorescent material at a second temperature lower than the first temperature.

13. A method according to claim 12, wherein said first temperature does not exceed 1500° C.

14. A method according to claim 12, wherein said first temperature does not exceed 1300° C.

* * * * *